(12) United States Patent
Yoshida

(10) Patent No.: US 8,632,146 B2
(45) Date of Patent: Jan. 21, 2014

(54) PRINTING APPARATUS, PRINTING METHOD, PRINTING CONTROL METHOD, AND COMPUTER PROGRAM

(75) Inventor: Seishin Yoshida, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 162 days.

(21) Appl. No.: 13/037,697

(22) Filed: Mar. 1, 2011

(65) Prior Publication Data

US 2011/0234660 A1 Sep. 29, 2011

(30) Foreign Application Priority Data

Mar. 25, 2010 (JP) ................................ 2010-071013

(51) Int. Cl.
*B41J 29/38* (2006.01)

(52) U.S. Cl.
USPC .............................................................. 347/9

(58) Field of Classification Search
CPC ....... B41J 2/17503; B41J 2/2107; B41J 2/211
USPC .......................................... 347/9–11, 98, 100
See application file for complete search history.

(56) References Cited

U.S. PATENT DOCUMENTS

| | | | |
|---|---|---|---|
| 5,997,132 A * | 12/1999 | Smith et al. ..................... 347/43 |
| 6,142,620 A | 11/2000 | Sagi | |
| 6,480,217 B1 | 11/2002 | Inoue et al. | |
| 6,733,105 B2 * | 5/2004 | Tatsumi ........................ 347/21 |
| 7,407,277 B2 | 8/2008 | Yoneyama | |
| 7,562,957 B2 | 7/2009 | Mills et al. | |
| 7,717,532 B2 * | 5/2010 | Kroon et al. ................... 347/15 |
| 8,035,854 B2 * | 10/2011 | Watanabe ..................... 358/1.9 |
| 2003/0149130 A1 | 8/2003 | Kondo | |
| 2005/0146544 A1 | 7/2005 | Kondo | |
| 2007/0216920 A1 | 9/2007 | Watanabe | |

FOREIGN PATENT DOCUMENTS

| | | |
|---|---|---|
| JP | 2001-001560 A | 1/2001 |
| JP | 2003-182061 A | 7/2003 |
| JP | 2006-050347 A | 2/2006 |
| JP | 2007-282205 A | 10/2007 |
| JP | 2010-052207 A | 3/2010 |
| JP | 2010-052248 A | 3/2010 |

* cited by examiner

*Primary Examiner* — An Do
(74) *Attorney, Agent, or Firm* — Global IP Counselors, LLP

(57) ABSTRACT

A printing head configured to apply white light-blocking ink, specialty gloss ink, and color ink is controlled, and the inks are applied so that the color ink, the specialty gloss ink, and the white light-blocking ink are formed in this order onto a printing medium having light-transmissive properties. When the printing medium is viewed from the surface on which ink has not been formed, a white ink layer is formed behind the color ink layer and the metallic ink layer, and light-blocking properties can be ensured. Because the amount of the metallic ink can be reduced, adequate expression of the color ink can be ensured.

9 Claims, 8 Drawing Sheets

PRINTING APPARATUS, PRINTING METHOD, PRINTING CONTROL METHOD, AND COMPUTER PROGRAM

CROSS-REFERENCE TO RELATED APPLICATIONS

This application claims priority to Japanese Patent Application No. 2010-071013 filed on Mar. 25, 2010. The entire disclosure of Japanese Patent Application No. 2010-071013 is hereby incorporated herein by reference.

BACKGROUND

1. Technical Field

The present invention relates to a printing technology for printing using a plurality of inks, and more particularly to printing using a light-blocking ink, a specialty gloss ink, and a color ink.

2. Related Art

In recent years, printing technologies for printing devices have appeared to become more diverse than mere color printing, especially in regard to printers for printing image data processed by a computer. Examples include a techniques whereby a white ink is applied to a printing medium in advance in order to reproduce an image, regardless of the ground color and texture of the medium to be printed, and color printing is performed thereon (Japanese Laid-Open Patent Publication No. 2007-282205); a technique whereby a light-blocking layer is formed for printing onto a light-transmissive printing medium (Japanese Laid-Open Patent Publication No. 2001-1560); and a technique whereby printing is performed to realize a special luster such as a metallic finish (Japanese Laid-Open Patent Publication No. 2006-50347).

However, research into printing technologies combining a plurality of inks other than color inks has been insufficient. For example, not enough research has been conducted into the differences in printing techniques for printing media having light-transmissive properties and printing media having light-diffusing properties. When the printing medium having light-transmissive properties is a transparent sheet, there are situations in which printing is performed so that the color printing can be viewed from the transparent sheet side. In these situations, the use of a large amount of metallic ink is being considered to block light from the rear. However, the metallic pigments used in metallic inks are typically expensive, and the use of metallic inks beyond a given quantity does not further improve the luster and lowers the brightness of color printing.

SUMMARY

An object of the present invention is to solve some of these problems associated with the prior art by providing a technology suitable for printing with a light-blocking ink, a specialty gloss ink, and a color ink.

In order to solve at least some of these problems, the present invention can assume the following forms or application examples.

According to a first aspect of the present invention, a printing apparatus for printing using a plurality of inks includes a printing head and a control unit. The printing head is configured to apply at least a light-blocking ink, a specialty gloss ink, and a color ink as the inks. The control unit is configured to control the printing head in at least one of a first mode for applying the inks in the order of the light-blocking ink, the specialty gloss ink, and the color ink onto a printing medium having light-diffusing properties, and a second mode for applying the inks in the order of the color ink, the specialty gloss ink, and the light-blocking ink onto a printing medium having light-transmissive properties.

Because the various inks are applied by this printing apparatus onto the printing medium so that the light-blocking ink, the specialty gloss ink, and the color ink are applied in the stated order from the side farthest from the visible side, the decorative properties of the specialty gloss ink and the varied expressions of the color ink can both be fully realized regardless of the printing medium.

A printing apparatus according to a second aspect is the printing apparatus of the first aspect, wherein the specialty gloss ink is applied onto the printing medium, a predetermined percentage being set as an upper limit.

In this printing apparatus, wasteful use of the specialty gloss ink can be avoided. This is because, when the control unit is configured to apply the specialty gloss ink onto the printing medium at a predetermined percentage set as an upper limit.

A printing apparatus according to a third aspect is the printing apparatus of the first or second aspect, wherein the specialty gloss ink is a texture-expressing ink including a pigment expressing a predetermined texture.

A printing apparatus according to a fourth aspect is the printing apparatus of the third aspect, wherein the specialty gloss ink is an ink whereby optical characteristics of the ink printed on a surface of the printing medium are dependent on an angle of reflection, or a metallic ink including a pigment expressing a metallic finish.

This printing apparatus is able to realize a predetermined texture, such as a metallic finish, on the printing medium.

The so-called specialty gloss ink in the present application exhibiting a special luster is an ink exhibiting a special luster on the surface of the printed medium after printing. It can also be a texture-expressing ink containing a pigment expressing a given texture. Metallic ink, which is one example of a specialty gloss ink, contains a metallic pigment expressing a metallic finish once fixed to the surface of the printing medium. In addition, the specialty gloss ink can be a pearlescent ink containing a pigment expressing a pearlescent luster once fixed to the surface of the medium, such as a pigment applied in multiple thin film layers having a pearl color such as that of a natural pearl; and lame ink or satin ink containing a pigment with a slightly irregular surface that diffuses reflected light after fixing to the surface of the medium and expresses a lame finish or satin finish. Metallic ink, which is one example of so-called specialty gloss ink in the present application, is ink with a metallic luster, and this metallic luster is expressed by the metallic pigment contained in the metallic ink. Such a metallic ink can be a metallic pigment dispersed in an appropriate solvent, such as an aqueous solvent or an oily solvent. The latter is an oil-based ink composition using a resin and an organic solvent as the solvent. In order to effectively create a metallic luster, the metallic pigment mentioned above is preferably in the form of plate-shaped particles. If the long axis and the short axis of the plane of the plate-shaped particles are X and Y, respectively, and the thickness of the plate-shaped particles is Z, the 50% average particle diameter R50 of the diameter of an equivalent circle determined from the area of the X-Y plane of the plate-shaped particles is from 0.5 to 3 μm. The condition R50/Z>5 is preferably satisfied. The metallic pigment can be formed from aluminum or an aluminum alloy, or can be created by crushing metalized film. The concentration of metallic pigment in the metallic ink can be, for example, from 0.1 to 10.0 wt %. As shall be apparent, there are no particular restrictions on the composition of the metallic ink. As long as a metallic luster is generated, any composition can be used.

The optical characteristics of the specialty gloss ink printed on the surface of the printing medium also can be dependent on the angle of reflection. The following is a description of a metallic ink that is one example of such a specialty gloss ink. Here, the metallic finish is described from the standpoint of the optical characteristics. Because the metallic finish is perceived as such from reflected light, its optical characteristics are dependent on the angle of reflection. Various indices for expressing a metallic finish have been proposed. It is accordingly possible to use such an index to define a metallic ink that expresses a metallic finish. For example, a common metallic finish index In1 expressed by Equation (1) can be used. In this metallic finish index In1, the brightness of the reflected light is measured at the three different locations as defined in Equation (1) when the measured object (a printed medium expressing a metallic finish) is exposed to light at an angle of −45°. The index is determined from the relationship of the brightnesses obtained at the three locations. Therefore, a metallic ink can be defined by the metallic finish index In1 to be the same as the metallic pigment used to express the metallic finish as described above.

$$In1 = \frac{2.69(L_1^* - L_3^*)^{1.11}}{L_2^{*0.86}} \qquad \text{Equation (1)}$$

$L^*_1$: Brightness at 30° Acceptance Angle (Entrance Angle −45°)

$L^*_2$: Brightness at 0° Acceptance Angle (Entrance Angle −45°)

$L^*_3$: Brightness at −65° Acceptance Angle (Entrance Angle −45°)

Other metallic finish indices that can be used include metallic finish index In2 expressed by Equation (2) using the brightnesses in three locations as in metallic finish index In1, and metallic finish index In3 expressed by Equation (3)

Equation (2)

$$In2 = \frac{3(L_1^* - L_3^*)}{L_2^*} \qquad (2)$$

Equation (3)

$$In3 = L_1^* - L_3^* \qquad (3)$$

Specialty gloss inks can be defined by these indices because each one of the indices expressed in the equations is determined as a numerical value dependent on the angle of reflection.

A so-called color ink in the present application generally includes black ink, and is not limited to cyan, magenta and yellow. It can also mean any ink with one or more hues such as red, orange, green and blue. These color inks commonly include dye inks which penetrate the ink absorbing layer of the printing medium and express a color in the ink absorbing layer, and pigment inks in which a pigment is dispersed in a solvent. Dye inks include dyes containing organic matter, and express a color defined by the organic matter contained therein. The dyes can be natural dyes or synthetic dyes. The following are examples of dye inks of various colors used in color printing.

In the following explanation, examples of light cyan and light magenta are provided in addition to the usual four colors of cyan, magenta, yellow, and black. Cyan ink is obtained by dissolving Direct Blue 99, which is a dye expressing the color cyan, in a solvent consisting, for example, of diethylene glycol and water mixed together to adjust the viscosity. Light cyan ink is obtained by dissolving this dye in the solvent described above, except that the amount of dye expressing the color cyan is reduced. Magenta ink is obtained by dissolving Acid Red 289, which is a dye expressing the color magenta, in the same solvent described above. Light magenta ink is obtained by dissolving this dye in the solvent described above, except that the amount of dye expressing the color magenta is reduced. Yellow ink is obtained by dissolving Direct Yellow 86, which is a dye expressing the color yellow, in the same solvent described above. Black ink is obtained by dissolving Food Black 2, which is a dye expressing the color black, in the same solvent described above. The viscosity of a dye-based color ink can be adjusted by adjusting the amount of dye, or the amount of diethylene glycol and water added to adjust the viscosity.

If the light-blocking ink and specialty gloss ink can be oil-based or water-based, they can be selected based on whether the color ink used in printing is oil-based or water-based and should be the same. They can also be oil-based or water-based depending on the order in which one ink is applied after another has been applied and dried in accordance with the printing timing.

A printing apparatus according to a fifth aspect is the printing apparatus in any one of the first to fourth aspects, further comprising a main scanning unit configured to move the printing head in a width direction of the printing medium. The printing head includes a plurality of nozzles aligned in a direction intersecting a movement direction of the printing head for each of the inks to discharge the inks. The nozzles for the inks are arranged in the order of the nozzles for the light-blocking ink, the nozzles for the specialty gloss ink, and the nozzles for the color ink from an upstream position in the movement direction of the printing head.

In this printing apparatus, the printing can be performed using a printing head equipped with nozzles. Because the nozzles for the various inks are arranged in the order of light-blocking ink, specialty gloss ink, and color ink from the start (upstream) in the traveling direction of the printing head, the discharge of ink from the nozzles can be controlled as the printing head moves in the main scanning direction to form ink layers onto the printing medium from the print medium side in the order of light-blocking ink, specialty gloss ink, and color ink. If printing is performed merely by moving the printing head in the opposite direction, ink layers can be formed onto the printing medium from the print medium side in the order of color ink, specialty gloss ink, and light-blocking ink.

A printing apparatus according to a sixth aspect is the printing apparatus in any one of the first to fifth aspects, wherein the printing medium is a light-transmissive printing medium having light-transmissive properties, and wherein the control unit applies the various inks to form in the stated order the color ink, the specialty gloss ink, and the light-blocking ink onto the light-transmissive printing medium.

In this printing apparatus, color printing can be viewed from the light-transmissive printing medium side. Because a specialty gloss ink region and a light-blocking ink region are formed behind the color ink, the visibility of the color ink is very high.

A printing apparatus according to a seventh aspect is the printing apparatus in any one of the first to sixth aspects, wherein in the second mode, the control unit is configured to apply a fixed amount of at least one of the light-blocking ink and the specialty gloss ink in a predetermined region including a region for applying the color ink regardless of an image to be printed.

In this printing apparatus, because a constant amount of at least the light-blocking ink or the specialty gloss ink is applied in a predetermined region including the region for applying the color ink, regardless of the image to be printed, the amount of both inks used can be limited.

A printing apparatus according to an eighth aspect is the printing apparatus in any one of the first to fifth aspects, wherein the printing medium is a light-diffusing printing medium having light-diffusing properties, and wherein the control unit applies the various inks to form in the stated order the light-blocking ink, the specialty gloss ink, and the color ink onto the light-diffusing printing medium.

In this printing apparatus, because an image is formed onto a light-diffusing printing medium from the printing medium side in the order of light-blocking ink, specialty gloss ink, and color ink, the image can be readily recognized from the printed side of the light-diffusing or opaque printing medium. Also, because a specialty gloss ink region and light-blocking ink region are formed behind the color ink, the visibility of the color ink is very high.

A printing apparatus according to a ninth aspect is the printing apparatus of the eighth aspect, wherein the printing medium has light-diffusing properties for the first mode is of a color whose brightness is lower than a print density realizable by black ink or the color ink. In the first mode, the control unit is configured to apply the light-blocking ink onto the printing medium having light-diffusing properties so that a value of a brightness index L* for a region in which the light-blocking ink has been applied is 70 or higher.

This printing apparatus is able to realize a color from the color ink close to the original color even when the ground color of the printing medium is not as bright as the printing density realizable by black ink or the color ink.

A printing apparatus according to a tenth aspect is the printing apparatus in any one of the first to ninth aspects, wherein the various inks are applied by discharging droplets of the various inks towards the printing medium.

Several techniques have been considered for applying ink to a printing medium, but can be easily realized by discharging ink from a printing head. Toner can also be applied to a latent image, and the visible image transferred to a printing medium. Ink prepared in the form of an ink ribbon can also be hot melted or sublimated, and transferred to a printing medium. Among printing apparatus discharging ink onto a printing medium, the on-demand method in which ink droplets are discharged when necessary has become increasing popular in recent years. However, the continuous discharge method can also be used. The printing head can be installed in a so-called serial printer which reciprocates in the width direction of the printing medium, or in a line printer in which a plurality of nozzles are arranged in the width direction of the printing medium.

The printing apparatus of the aspects described above can also be regarded as a printing method. In other words, it can be regarded as a printing method for printing using a plurality of inks. In this method, a printing head able to apply at least a light-blocking ink, a specialty gloss ink, and a color ink is controlled while moving relative to a printing medium, and the various inks are applied onto the printing medium so that the light-blocking ink, the specialty gloss ink, and the color ink are formed in the stated order from the side farthest from the visible side.

The actual printing operation can be divided between a device for applying ink to a printing medium, and a device such as a computer for outputting printing data to this device. Thus, the present invention can be regarded as a printing control method for printing using a plurality of inks. In this printing control method, image data for an image to be printed is received, and a light-blocking ink application range, a specialty gloss ink application range, and a color ink application range are determined based on the image data. The amounts of light-blocking ink and specialty gloss ink to be applied in the light-blocking ink application range and the specialty gloss ink application range are determined, and the amount of color ink to be applied in the color ink application range is determined based on the tone values in the image data. A printing head for applying the various inks to a printing medium is controlled, and the various inks are applied onto the printing medium so that the light-blocking ink, the specialty gloss ink, and the color ink are formed in the stated order from the side farthest from the visible side.

As shall be apparent, the printing control method of the present invention can be regarded to be a program executed by a computer, or a non-transitory storage medium recording such a program.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
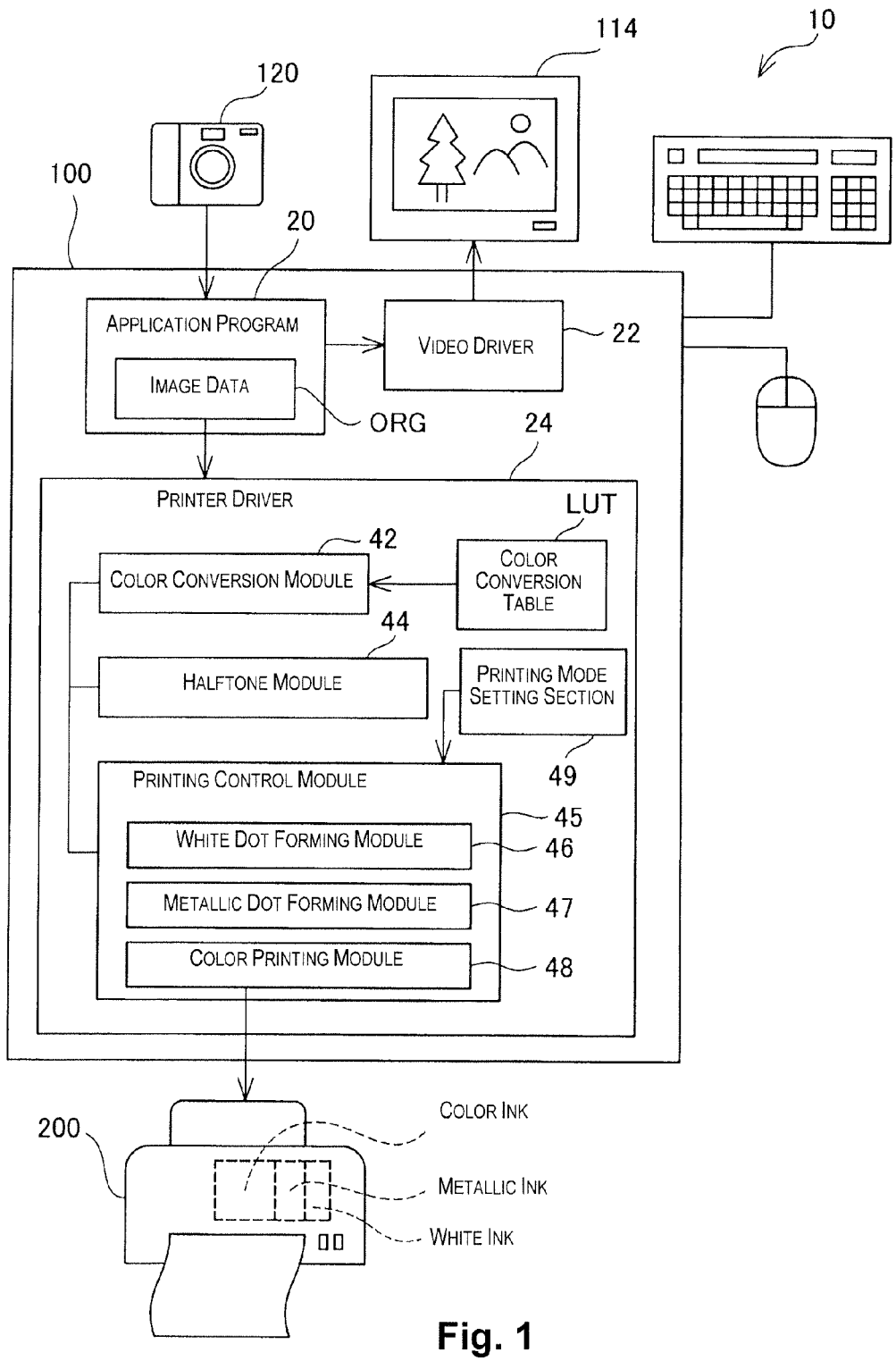
FIG. 1 is a schematic view of a printing system 10 according to an embodiment of the present invention.

An embodiment of the present invention will now be explained. FIG. 1 is a schematic view of a printing system 10 according to an embodiment of the present invention. As shown in the drawing, the printing system 10 in this embodiment includes a computer 100 serving as the printing control device, and a printer 200 for actually printing an image under control of the computer 100. Broadly speaking, the entire printing system 10 functions as a printing apparatus.

A. Hardware Configuration

The printer 200 in this embodiment includes as color inks cyan (C), magenta (M), yellow (Y), and black (K). It is also printably furnished with metallic ink (S) exhibiting a metallic luster due to the metallic pigment contained therein, and white ink (W) containing a white pigment used as a light-blocking ink. In this specification, the meaning of color ink also includes black ink. However, the color inks in this printer 200 do not include black ink. The color black is expressed as a so-called composite black using cyan, magenta, and yellow inks. The composition of these inks and the configuration of the printer 200 are explained below.

The following is an explanation of the configuration of a computer 100 used to prepare printing data and supply the printing data to the printer 200. A given operating system is installed in the computer 100, and an application program 20 is operated based on the operating system. A video driver 22 and a printer driver 24 are incorporated into the operating system. The application program 20 inputs image data ORG, for example, from a digital camera 120 via a peripheral device interface 108. Then, the application program 20 displays the image represented by the image data ORG on a display 114 via the video driver 22. The application program 20 also outputs image data ORG to the printer 200 via the printer driver 24.

In this embodiment, the image data ORG inputted by the application program 20 from the digital camera 120 contains three color data of red (R), green (G), and blue (B), as well as white ink (W) data and metallic ink (S) data if necessary. In other words, the R, G, B color region (referred to as the color region below) and the region in which the metallic ink is printed (referred to as the metallic region below) can be indicated by the application program 20 in any region inside the image data ORG, and the region in which the white ink is applied to the printing medium (hereinafter referred to as the white region) is automatically set based on the designation of the color region and the metallic region. Portions of the metallic region and the color region overlap, and the background color in the overlapping region has a metallic luster expressed by the metallic pigment in the metallic ink. A color image is formed onto this. In other words, the overlapping region is a metallic color region. A metallic region (simple metallic region) can be form using metallic ink only. When a metallic region is designated in this way, the application program 20 is programmed to determine whether the region was designated beforehand. For example, a printing region with a specific shape can be a metallic region. The application program 20 is also programmed to set a printing region of a specific color as a metallic region.

On the other hand, in this embodiment, a white region is automatically generated in a region where the color region overlaps with the metallic region. As explained below, a white region is used to generate a white background color to back up the expression of the various inks. How the various regions are generated is explained in greater detail below.

A printer driver 24 receives image data from the application program 20, and converts the image data to data that can be outputted to the printer 200. This driver includes a color conversion module 42 for performing color conversion, a color conversion table LUT referenced when a color conversion is performed by the color conversion module 42, a halftone module 44 for generating multiple values for the image data after color recovery, a printing control module 45 for converting the multiple-value data to dot data for the color inks, and a printing mode setting unit 49 for setting the printing control module 45. The printing control module 45 includes a white dot forming module 46, a metallic dot forming module 47, and a color printing module 48.

The color conversion module 42 receives the RGB-formatted image data ORG from the application program 20, references the color conversion table LUT prepared beforehand, and converts the RGB color components in the color region of the image data ORG into color components (cyan (C), magenta (M), yellow (Y), and black (K)) that can be printed by the printer 200.

The halftone module 44 performs halftone processing in which the tones in the image data converted by the color conversion module 42 are expressed as a dot distribution. In this embodiment, the halftone processing is performed using the ordered dithering method common in the art. In addition to the ordered dithering method, the halftone processing can be performed using the error diffusion method, the concentration pattern method, or any other halftone technique common in the art.

The printing control module 45 converts the dot formations for the various inks into instruction signals for the printer 200 using the halftone-processed data. The metallic dot forming module 47 forms metallic dots of a predetermined size in the metallic region indicated by the application program 20. In this embodiment, the amount of metallic pigment per unit area distributed in the metallic region can be determined by any change in the size of the metallic dots. For example, the distributed amount of metallic pigment can be increased to heighten the metallic luster and the distributed amount of metallic pigment can be decreased to tone down the metallic luster. The color printing module 48 forms dots using the different color inks in the halftone-processed image, i.e., in the image for the color region. The white dot forming module 46 forms white dots in the same regions as the metallic region and the color region. The printing control module 45 references the settings for the printing mode setting unit 49, and operates the printer 200 by outputting various commands such as the start printing command and end printing command to the printer 200.

Before the printing process starts, the printing mode setting unit 49 receives a command from the user indicating execution of the first printing mode in which a light-diffusing printing medium such as a black sheet is printed, or the second printing mode in which a light-transmissive printing medium such as a transparent sheet is printed, and sets the printing mode based on the received command. The set printing mode is displayed on the setting screen appearing on the display 114 of the computer 100, and a command is received from the user. Printing in the first and second printing modes will be described in detail below.

Figure 2:
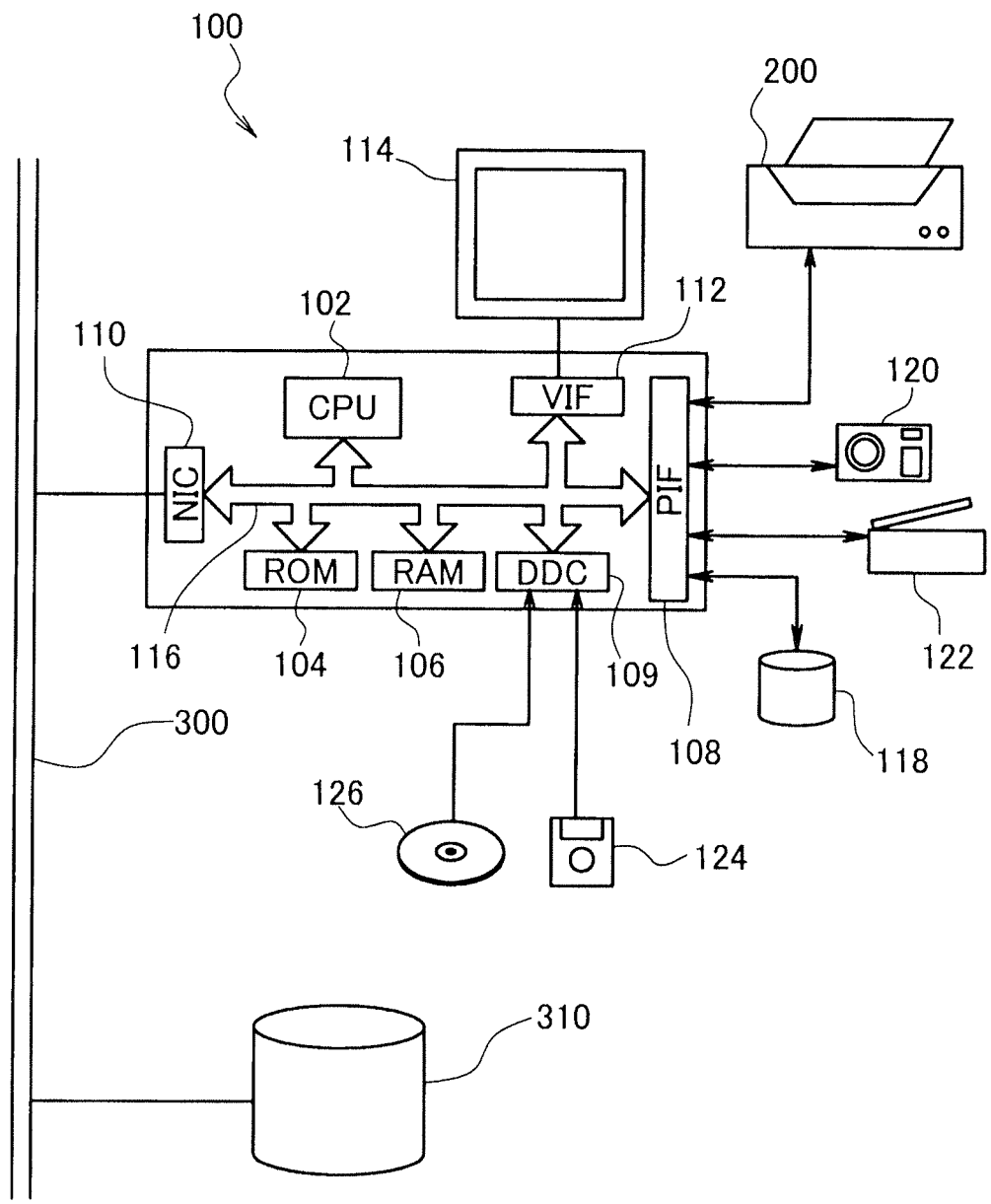
FIG. 2 is a configuration view of a computer 100 serving as a printing control device.

The following is a detailed explanation of the configuration of the computer 100 used as the printing control device. FIG. 2 is a configuration view of the computer 100. The core of the computer 100 is the CPU 102, and several components common in the art such as ROM 104 and RAM 106 are connected via a bus 116.

The computer 100 is connected to a disk controller 109 for retrieving data from a flexible disk 124 or a compact disk 126, a peripheral device interface 108 for receiving data from peripheral devices, and a video interface 112 for driving the display 114. A printer 200 and a hard disk 118 are connected to the peripheral device interface 108. If a digital camera 120 and a color scanner 122 are connected to the peripheral device interface 108, images taken from the digital camera 120 and the color scanner 122 can be processed. If a network interface card 110 is installed, the computer 100 can be connected to a communication line 300, and data stored in a storage device 310 connected to the communication line can be retrieved. When the computer 100 retrieves image data to be printed, the printer 200 is controlled by the activity of the printer driver 24 described above, and the image data is printed.

Figure 3:
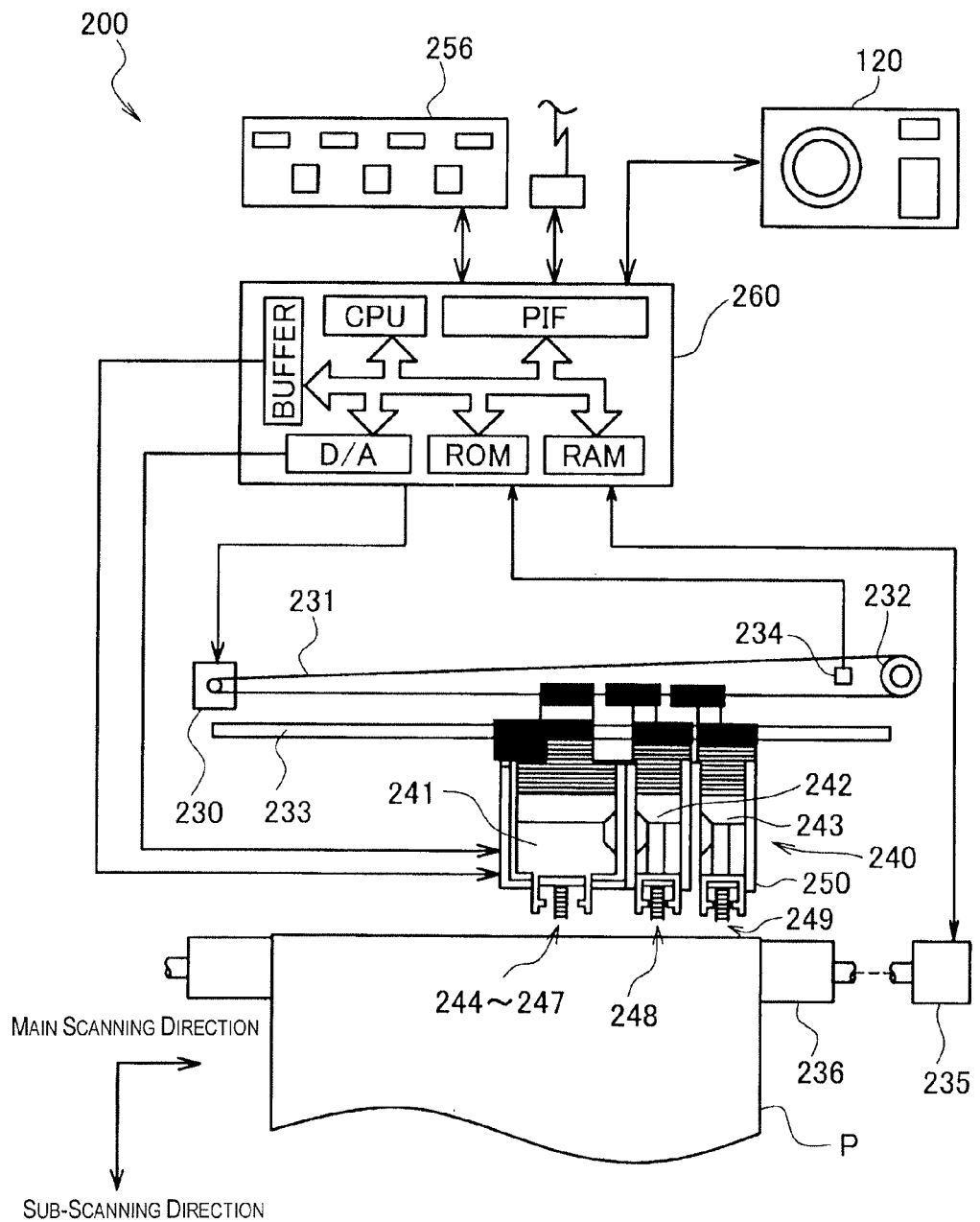
FIG. 3 is a block diagram showing the schematic structure of a printer 200.

The following is an explanation of the configuration for the printer 200. FIG. 3 is a block diagram showing the schematic structure of a printer 200. As shown in FIG. 3, the printer 200 has a mechanism for transporting a printing medium P using a paper feeding motor 235, a mechanism for reciprocating a carriage 240 in the axial direction of a platen 236 using a carriage motor 230, a mechanism for driving a printing head 250 mounted on the carriage 240, discharging ink, and forming dots, and a control circuit 260 for sending signals to the paper feeding motor 235, the carriage motor 230, the printing head 250, and the control panel 256.

The mechanism for reciprocating the carriage 240 in the axial direction of the platen 236 is composed of a sliding shaft 233 disposed along the axis of the platen 236 for slidingly holding the carriage 240, a pulley 232 supporting an endless drive belt 231 along with the carriage motor 230, and a position detecting sensor 234 for detecting the home position of the carriage 240.

A color ink cartridge 241 is mounted on the carriage 240 containing as the color inks cyan ink (C), magenta ink (M), yellow ink (Y), and black ink (K). A metallic ink carriage 242 containing metallic ink (S), and a white ink carriage 243 containing white ink (W) are also mounted on the carriage 240. Six types of ink discharging heads 244-249 corresponding to the various inks are formed in the printing head 250 below the carriage 240. When the ink cartridges 241, 242, 243 are mounted in the carriage 240 from above, ink can be supplied from the cartridges to the ink discharging heads 244-249.

B. Ink System

The color inks housed in the color ink cartridge 241 are dye-based color inks including organic matter expressing the CMYK colors. The cyan ink (C) contains 3.6 wt % Direct Blue 99, which is a dye expressing the color cyan. This dye is dissolved in a solvent composed of a mixture of 30 wt % viscosity-adjusting diethylene glycol, 1 wt % Surfynol 465, and 65.4 wt % water. The magenta ink (M) contains 2.8 wt % Acid Red 289, which is a dye expressing the color magenta. This dye is dissolved in a solvent composed of a mixture of 20 wt % viscosity-adjusting diethylene glycol, 1 wt % Surfynol 465, and 76.2 wt % water.

The yellow ink (Y) contains 1.8 wt % Direct Yellow 86, which is a dye expressing the color yellow. This dye is dissolved in a solvent composed of a mixture of 30 wt % viscosity-adjusting diethylene glycol, 1 wt % Surfynol 465, and 67.2 wt % water. The black ink (K) contains 4.8 wt % Food Black 2, which is a dye expressing the color black. This dye is dissolved in a solvent composed of a mixture of 35 wt % viscosity-adjusting diethylene glycol, 1 wt % Surfynol 465, and 69.2 wt % water. Each one of these inks is adjusted to a viscosity of 3 (mPa·S) in order to not obstruct the discharge of ink from the discharge head.

Other inks can be used in addition to the color inks described above. For example, light cyan and light magenta can be added when the object is to improve graininess. In this case, the dye concentration is about one-quarter that of the cyan ink and magenta ink. These can be combined with one or more special color inks such as red, orange, green, and blue. These special color inks are effective when the color reproduction range in the printer 200 is expanded, for example, to accurately express a stored color.

In this embodiment, the metallic ink (S) stored in the metallic ink cartridge 242 is a metallic pigment dispersed in an aqueous solvent. The metallic pigment in the ink is defined in the following way. For example, if, when using a metallic pigment containing plate-shaped particles, the long axis and the short axis of the plane of the plate-shaped particles are X and Y, respectively, and the thickness of the plate-shaped particles is Z, then the 50% average particle diameter R50 of the diameter of an equivalent circle determined from the area of the X-Y plane of the plate-shaped particles is from 0.5 to 3 µm. The condition $R50/Z>5$ is preferably satisfied. The metallic pigment can be formed from aluminum or an aluminum alloy, or can be created by crushing metalized film. In this embodiment, the metallic pigment is formed from aluminum. The concentration of metallic pigment in the metallic ink (S) can be, for example, from 0.1 to 10.0 wt %; and in this embodiment is 1.5 wt %.

The white ink (W) contained in the white ink cartridge 243 uses titanium dioxide as the pigment. The titanium dioxide is dispersed in water and a suitable amount of organic solvent. In addition to titanium dioxide, pigments exhibiting a white color include inorganic white pigments such as oxides, sulfates, and carbonates of zinc, lead, barium, titanium, and antimony. In order to improve the dispersion properties, the particle size of the colorants described above is preferably 2.0 µm or less, and more preferably 0.2 µm or less. The amount of pigment added can range from 1 to 50 wt % as needed. The pigment can simply be dispersed in a solvent such as water, or can be added as a pigment dispersion in which the pigment is dispersed in an aqueous solvent using a dispersant or surfactant. The dispersant can be any dispersant commonly used to disperse pigments.

The organic solvent contained in the white ink (W) can be a low boiling point organic solvent such as methanol, ethanol, n-propyl alcohol, isopropyl alcohol, n-butanol, sec-butanol, tert-butanol, iso-butanol, and pentanol. The amount ranges from 0.1 to 10 wt % depending on the characteristics of the ink.

The white ink (W) can also contain a wetting agent or penetrant to prevent clogging of the nozzles in the printing head. The wetting agent can be diethylene glycol, polyethylene glycol, polypropylene glycol, or any substance commonly found in the natural world such as cellulose. The amount of wetting agent added to the ink is from 0.5 to 40 wt %, preferably from 2 to 20 wt %. The penetrant can be an alkylether derivative of a polyhydric alcohol. Specific examples include diethylene glycol mono-n-butylether, triethylene glycol mono-n-butylether, and propylene glycol mono-n-butylether. A mixture of two or more can also be used. The amount of alkylether derivative of polyhydric alcohol used here ranges from 0.5 to 20 wt %, and preferably from 3 to 15 wt %, relative to the prepared dispersion.

C. Nozzle Groups

Figure 4:
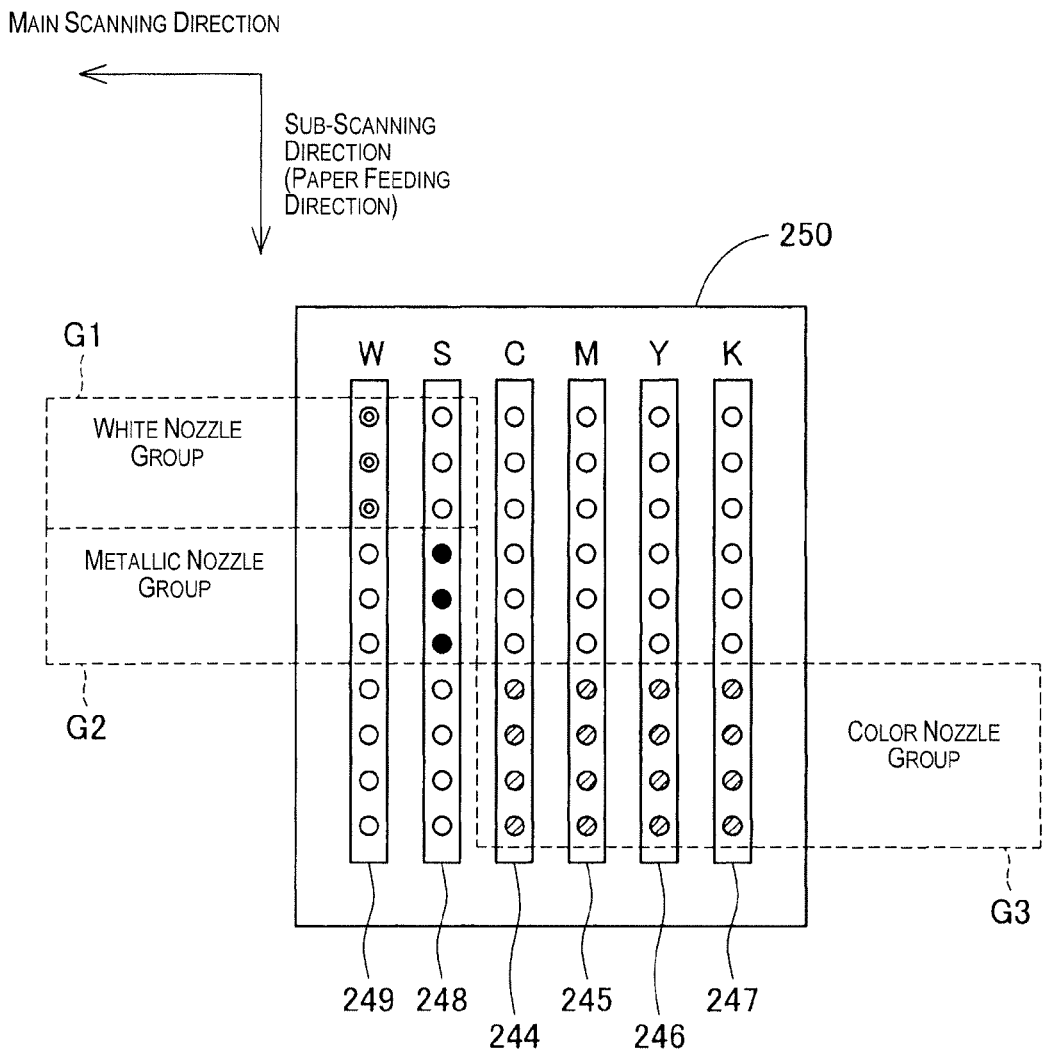
FIG. 4 is a view used to illustrate the usage range for the nozzles and the nozzle groupings in a printing head 250.

The following is an explanation of the printing head 250. FIG. 4 is a view used to describe the arrangement of the nozzles in the ink discharging head constituting the printing head 250. Here, 96 nozzles have been prepared for each one of the inks, the white ink (W), the metallic ink (S), the cyan ink (C), the magenta ink (M), the yellow ink (Y), and the black ink (K). For the sake of simplicity, only ten nozzles are shown in FIG. 4 for each color. In the following explanation, there are only ten nozzles for each color. However, the actual number of nozzles depends on the specifications for the printer 200. The nozzles discharging the color inks are arranged on the bottom surface of the printing head 250 in the sub-scanning direction. The nozzles are arranged in the sub-scanning direction in two raster rows, i.e., at two-dot intervals. In the drawing, the sub-scanning direction (paper feeding direction) faces downward. Therefore, during printing, the printing locations on the printing medium P pass by from the nozzles shown at the very top.

A piezo element is incorporated into each nozzle shown in FIG. 4. As is commonly known, the crystalline structure of piezo elements are distorted by the application of voltage, performing an electric-mechanical energy conversion very quickly. In this embodiment, a predetermined voltage signal (drive signal) is applied to a piezo element to deform the wall on one side of the ink passage inside the nozzle and discharge an ink droplet from the nozzle. In this embodiment, ink is discharged using the piezo elements described above. However, the method can be used in which a bubble is generated inside a nozzle, and ink is discharged.

In the printing apparatus 10 in this embodiment, when white ink, metallic ink, and color ink are applied to a printing medium P, printing is performed in a single direction to time the application of the different inks. Also, among the ink discharging nozzles prepared in the printing head 250, the number of nozzles used for each ink is limited to M (M=32 in this embodiment). In the first printing mode, among the ink discharging heads 244-249 for each color prepared in the printing head 250, the ink discharging head 249 for the white ink uses M nozzles (the 1st through Mth nozzles) among the 96 nozzles on the side where the printing medium P begins to pass by or from the side where the process starts in the sub-scanning direction. The rest of the nozzles remain unused. These are shown as the 1st through 3rd nozzles in FIG. 4. The following are illustrated in the same manner in FIG. 4. The ink discharging head 248 for the metallic ink uses M nozzles (the M+1st through 2Mth nozzles) among the 96 nozzles, and the rest of the nozzles remain unused. The ink discharging heads 244-247 for the color inks (C, M, Y, K) each use M nozzles (the 2M+1st through 96th nozzles) among the 96 nozzles, and the rest of the nozzles remain unused.

Below, the nozzles discharging white ink are called the 1st nozzle group G1, the nozzles discharging metallic ink are called the 2nd nozzle group G2, and the nozzles discharging color inks are called the 3rd nozzle group G3. The discharge operations for the various inks are performed during printing. However, when the printing head 250 has reciprocated once in the main scanning direction, the printing medium P has advanced only a predetermined distance in the sub-scanning direction. From the standpoint of the printing medium P, in a single raster, white ink was initially discharged from the 1st nozzle group G1, metallic ink was then discharged from the 2nd nozzle group G2, and color inks were finally discharged from the 3rd nozzle group G3.

In the second printing mode, the nozzles used are the complete opposite of those used in the first printing mode. In other words, among the ink discharging heads 244-249 for each color prepared in the printing head 250, the ink discharging heads 244-247 for the color inks use M nozzles among the 96 nozzles from the start of the process in the sub-scanning direction, and the rest of the nozzles remain unused. The ink discharging head 248 for the metallic ink uses M nozzles among the 96 nozzles (the M+1st through the 2Mth nozzle), and the rest of the nozzles remain unused. The ink discharging head 249 for the white ink uses M nozzles among the 96 nozzles (the 2M+1st through 96th nozzle), and the rest of the nozzles remain unused. As a result, in the second printing mode, from the standpoint of the printing medium P, in a single raster, color inks were initially discharged from the 3rd nozzle group G3, metallic ink was then discharged from the 2nd nozzle group G2, and white ink was finally discharged from the 1st nozzle group G1.

The printing head 250 explained above is controlled by a control circuit 260 in the printer 200 as shown in FIG. 3. The control circuit 260 is connected via a bus to the CPU, ROM, RAM, and a PIF (peripheral device interface). It controls the main scanning operation and the sub-scanning operation of the carriage 240 by controlling the operation of the carriage motor 230 and the paper feeding motor 235. When printing data outputted from the computer 100 via the PIF is received, and the carriage 240 reciprocates in the main scanning direction, the discharge of ink is controlled and a predetermined raster is printed by supplying drive signals based on the printing data to the ink discharging heads 244-249. When the reciprocation along with the discharge of ink reaches the end in the width direction of the printing medium P, the control circuit 260 transports the printing medium P in the sub-scanning direction, and the next raster is printed. By repeating this operation, the printer 200 ends the printing in the first or second printing mode.

The printer 200 explained in this embodiment is a so-called inkjet printer in which ink droplets are discharged towards the printing medium P, and ink dots are formed. However, a printer using another technique to apply ink to a printing medium can also be used. For example, instead of discharging ink droplets, the printer can apply ink by using static electricity to affix toner powders in various colors to a printing medium. A thermal transfer printer, or sublimation printer can also be used.

D. Printing Process

Figure 5:
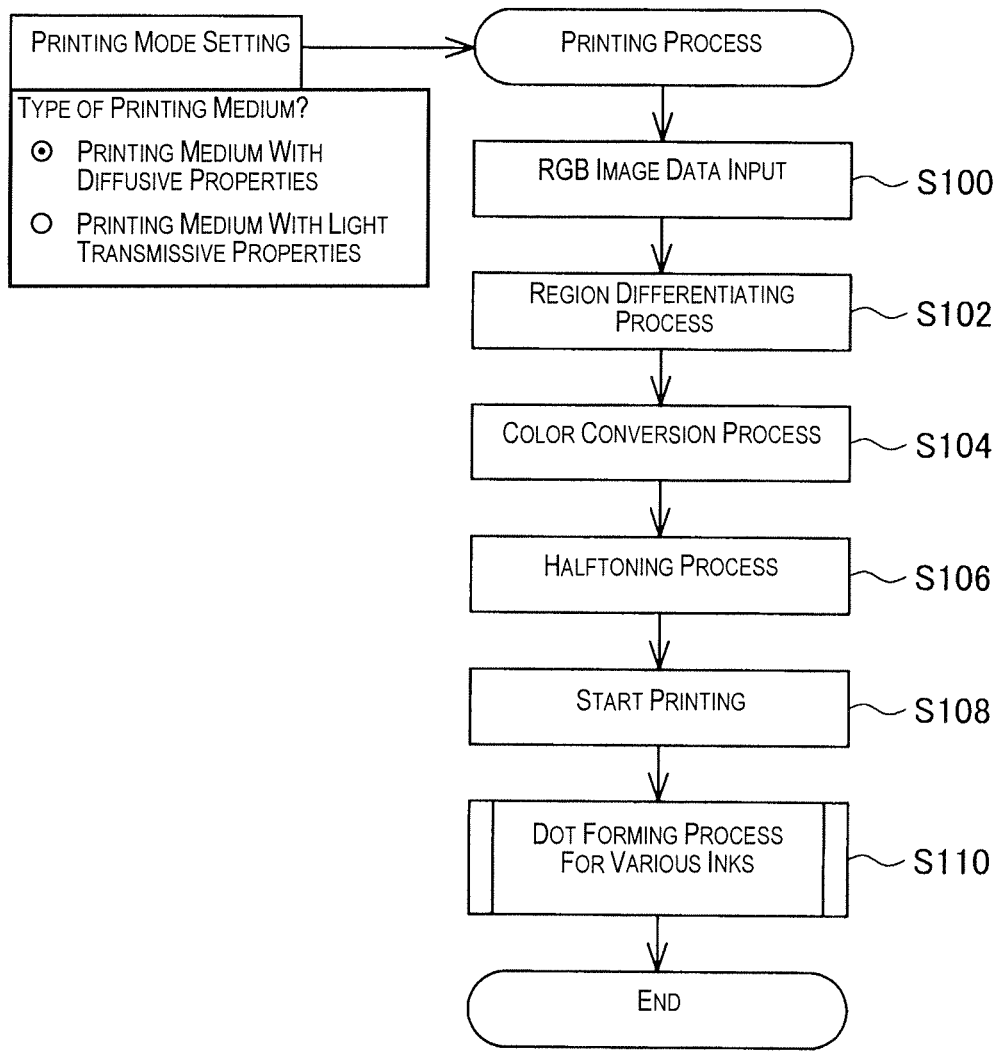
FIG. 5 is a flowchart showing a summary of the printing process.

FIG. 5 is a flowchart of the printing process in the embodiment. In this embodiment, the computer 100 identifies a metallic region using metallic ink, and limits the use of metallic ink in the regions outside of the metallic region, printing only with color inks in these regions. When the printing process begins, the printing mode setting unit 49 receives a command from the user to execute either the first printing mode or the second printing mode. The printing mode is then set based on the received command.

Figure 6A:
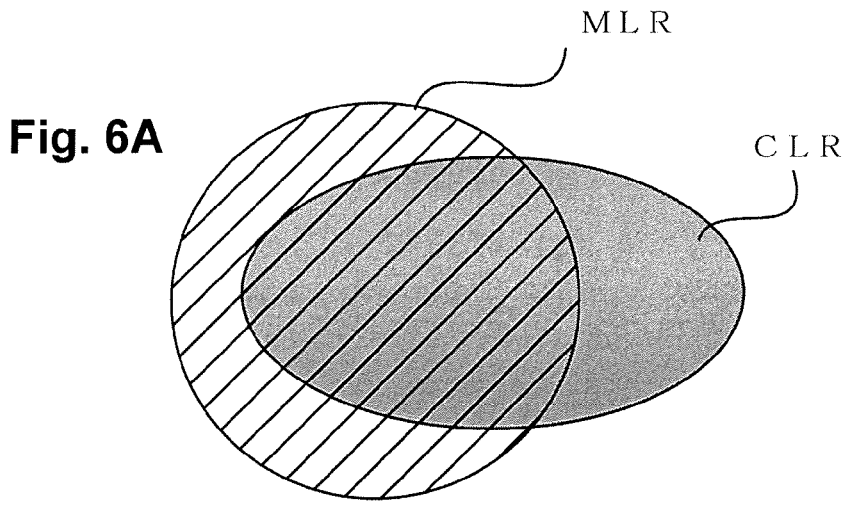
FIGS. 6A to 6C are views used to illustrate the relationship between the metallic range and the color expression range.
Figure 6B:
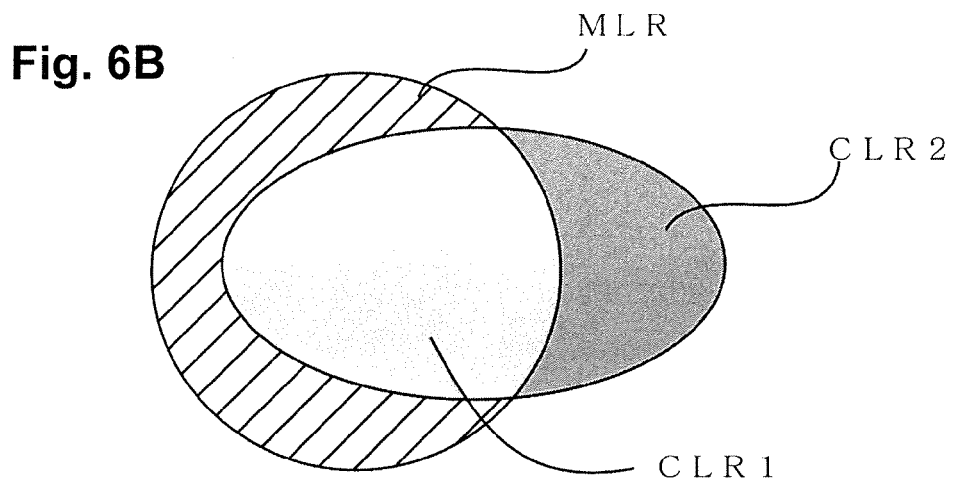
Figure 6C:
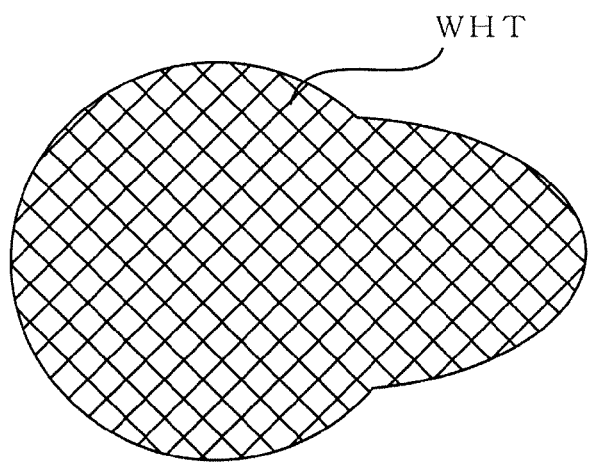

When the printing process begins, the computer 100 first inputs RGB-formatted image data (Step S100). When image data has been inputted, the computer 100 differentiates the various regions determined by the application program 20 (Step S102). In the region differentiating process, the application program, for example, as shown in FIG. 6A, creates region MLR for a gold color or silver color, and creates region CLR expressed in color. When this is used in the printing process, the various regions are determined, and, as shown in FIG. 6B, metallic region MLR in which dots are formed in metallic ink (S), color-expressing region CLR1 in which metallic ink (S) and color ink (CMYK) are formed, and color-expressing region CLR in which color ink (CMYK) only is formed are differentiated. The data is then separated for each region. Also, as shown in FIG. 6C, a region corresponding to the logical sum of metallic region MLR and the color-expressing regions CLR is determined as white region WHT. The color-expressing regions are divided in two because the percentage of color ink is adjusted in region CLR1 which overlaps with the metallic ink so that the visible difference is smaller with region CLR2 which does not overlap with the metallic ink. The presence or absence of metallic ink changes the expression of the color inks, but adjustment is not required when used properly and proactively in the printing process. Here, the color-expressing region can be differentiated as a single region.

When the various regions have been differentiated in Step S102, the computer 100 then uses the color conversion module 42 to convert the RGB-formatted image data inputted in Step S100 to CMYK-formatted image data for the various regions (Step S104). When CMYK-formatted image data has been obtained, the computer 100 uses the halftone module 44 to perform halftone processing, and data transferrable to the printer 200 is generated (Step S106). In the halftone processing, binarization processing is performed not only for the color inks, but also for the metallic ink (S) and the white ink (W). Halftone processing is performed for the metallic ink (S) so that the dot recording rate is 30% throughout the metallic region MLR mentioned above. In the case of metallic ink (S), the metallic luster increases with the amount of ink (recording rate) until the dot recording rate reaches 30%. When 30% is exceeded, hardly any increase in metallic luster is visible. Therefore, in this embodiment, the halftone processing is performed so that the dot recording rate is 30%. In the case of the white ink (W), dots are formed with white ink in region WHT, which is the logical sum of the color-expressing region CLR and the metallic region MLR described above. Here, halftone processing is performed in the same manner as the metallic ink to obtain a uniform recording rate of 80%. In the first printing mode, white ink is applied to aid in the expression of the metallic ink and the color inks. For example, if the brightness index L* for the region in which the white ink has been applied is 70 or greater, the expression of the color ink is certain to be adequate. In order to achieve a brightness index L* for the region in which the white ink has been applied of 70 or greater, the dot recording rate should be from 80 to 90%. Because it is applied in the second printing mode to aid in the light-blocking properties of the metallic ink, the dot gain should be taken into account, and the recording rate for the droplets of white ink should exceed the degree of overlap.

When the halftone processing has been completed, the computer 100 uses the printing control module 45 to control the printer 200, and start the printing (Step S108). When the printing has started, the printer 200 forms dots from the various inks (Step S100). The dots are formed from the various inks in the following manner over the entire range in which an image is formed on a printing medium P.

Dot Formation in the 1st Printing Mode

When printing has started and the first printing mode has been set by the printing mode setting unit 49, dots of the various inks are formed in the following manner. The first printing mode is the printing mode for printing on a light-diffusing printing medium. In this embodiment, it is assumed that printing is performed on a black sheet. When the first printing mode has been designated, the control circuit 260 controls the various ink discharging heads 244-249 to discharge the various inks along with the reciprocation of the carriage. Also, as described above, printing is performed using only some of the nozzles for each ink. Therefore, the following operations are performed in a single raster.

(1) First, white ink discharged from the 1st nozzle group G1 is applied to the printing medium P.

(2) Next, metallic ink discharged from the 2nd nozzle group G2 is applied to the printing medium P.

(3) Finally, color ink discharged from the 3rd nozzle group G3 is applied.

Figure 7:
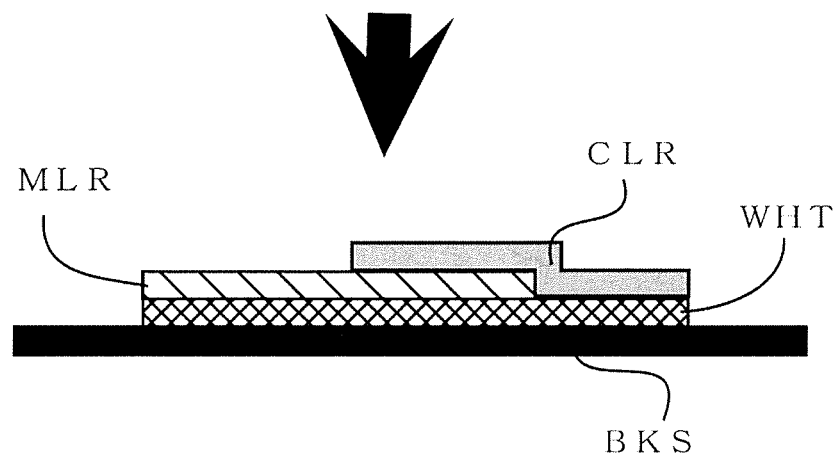
FIG. 7 is a view used to illustrate printing results from the first printing mode.

As a result, when there is a metallic region and a color-expressing region formed on a black sheet BKS serving as a light-diffusing printing medium, as shown in FIG. 7, white ink (W) is first applied, and a white ink layer WHT is formed. Metallic ink (S) is applied onto this, and a metallic region MLR is formed. The color inks (C, M, Y, K) are applied onto this, and a color-expressing region CLR is formed. As a result, when the printed black sheet BKS is viewed from the printed surface side PS, the brightness of the printed regions on the black sheet BKS can be ensured because the metallic region MLR and the color-expressing region CLR have been formed onto a white ink layer WHT. The luster of the metallic ink is adequate, and the colors are sufficiently expressed by the color inks. In this embodiment, a black sheet is used as the light-diffusing printing medium. However, the same effect can also be obtained if an opaque sheet with a dark ground color is used.

Dot Formation in the 2nd Printing Mode

When printing has started and the second printing mode has been set by the printing mode setting unit 49, dots of the various inks are formed in the following manner. The second printing mode is the printing mode for printing on a light-transmissive printing medium. In this embodiment, it is assumed that printing is performed on a transparent sheet. The transparent sheet used in the embodiment is a synthetic resin sheet having formed a transparent permeable layer for fixing an aqueous ink to a printing surface of the sheet. When the second printing mode has been designated, the control circuit 260 controls the various ink discharging heads 244-249 to discharge the various inks along with the reciprocation of the carriage. Also, as described above, printing is performed using only some of the nozzles for each ink. Therefore, the following operations are performed in a single raster.

(A) First, color ink discharged from the 3rd nozzle group G3' is applied to the printing medium P.

(B) Next, metallic ink discharged from the 2nd nozzle group G2' is applied to the printing medium P.

(C) Finally, white ink discharged from the 1st nozzle group G1' is applied to the printing medium P.

Figure 8:
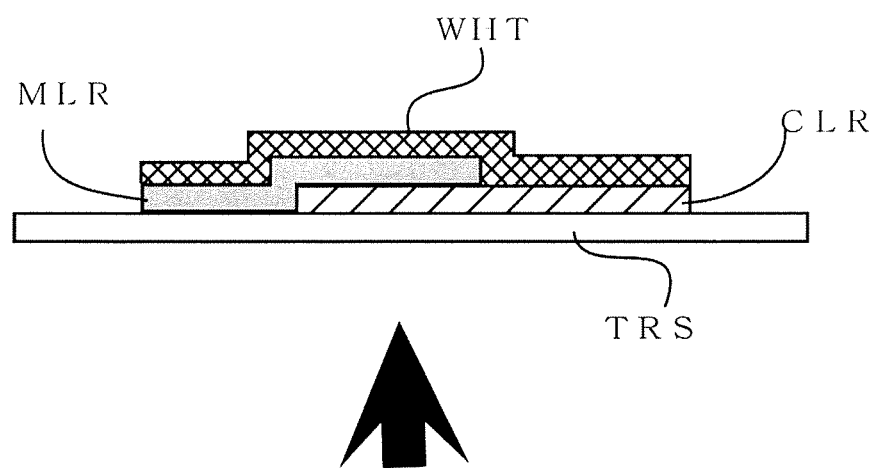
FIG. 8 is a view used to illustrate printing results from the second printing mode.

As a result, when there is a metallic region and a color-expressing region formed on a transparent sheet TRS serving as a light-transmissive printing medium, as shown in FIG. 8, color inks (C, M, Y, K) are applied first, and a color-expressing region CLR is formed. Metallic ink (S) is applied onto this, and a metallic region MLR is formed. The white ink (W) is applied onto this, and a white ink layer WHT is formed. As a result, when the printed transparent sheet TRS is viewed from the transparent sheet side RS, the color-expressing region CLR is formed on the transparent sheet TRS side. Because a white ink layer WHT is formed in the background of this, sufficient light-blocking properties can be ensured on a transparent sheet TRS simply by using a small amount of metallic ink. The luster of the metallic ink is also sufficient.

Figure 9:
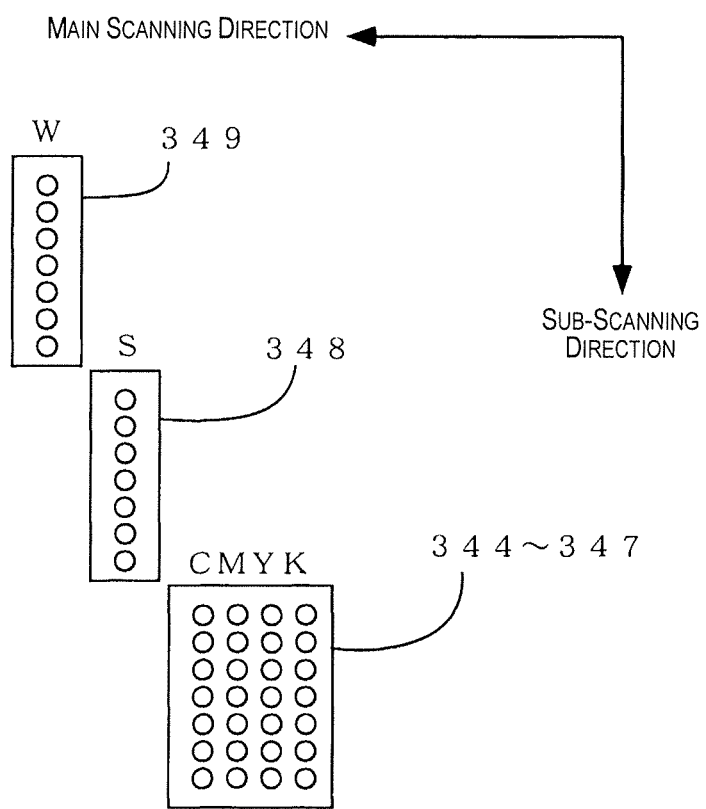
FIG. 9 is a diagram used to illustrate the configuration of another example of a printing head.

An embodiment of the present invention was explained above, but the present invention is not limited to this embodiment; it being apparent that a variety of modifications are possible without altering the essentials of the present invention. For example, as shown in FIG. 9, a printer can be used having a configuration in which the ink discharging heads 344-349 have been staggered in the sub-scanning direction from the beginning. As shall be apparent, the various ink discharging heads are arranged in the same positions. In the first printing mode, printing is first performed on the printing medium P using only white ink. After advancing the printing medium P the length of a sheet of paper in the sub-scanning direction, the printing medium P returns to the printing start position, and the process can be repeated to print in metallic ink then in color ink in the stated order.

In this embodiment, the metallic ink and the color ink were discharged on the printing medium in the same raster at different times. However, the inks can be discharged simultaneously in the same raster during printing. When a water-based metallic ink and color ink are discharged at nearly the same time, there is a certain degree of mixing between the inks. By giving the white ink layer and the absorbent layer on the surface of the printing medium P different chemical properties, and by using the specific gravity of the metallic pigment dispersed in the metallic ink, color ink can be expressed onto metallic ink in the first printing mode, and concealed beneath metal ink in the second printing mode. As a result, white ink, specialty gloss ink, and color ink can be formed in the stated order from the side farthest from the visible side. However, the inks can be applied in any order.

Also, in the embodiment described above, the dot recording rate for the metallic ink and the dot recording rate of the white ink are fixed. However, these can be dependent on the image data. For example, the dot recording rate for the metallic ink can be adjusted based on the dot recording rate for the color ink. In this case, the dot recording rate for the white ink should be corrected from the standpoint of light-blocking properties so that the sum total of the white ink recording rate and metallic ink recording rate remains constant. Otherwise, the final ink recording rate can be limited by the ink duty of the recording medium.

Also, in this embodiment, a white ink containing titanium oxide was used as the light-blocking ink. However, any ink having light-blocking properties can be used. As shall be apparent, using a bright ink such as white ink as the light-blocking ink is advantageous from the standpoint of color ink development. The white ink does not have to have a simple white pigment. A white ink with a pearly luster can also be used. In this embodiment, a dye-based ink was used as the color ink. However, a pigment-based ink can also be used. Also, in this embodiment, all of the inks were water-based. However, all of the inks can be oil-based as well. Water-based and oil-based inks can also be mixed to make sure the printing timing is adequate.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A printing apparatus for printing using a plurality of inks, the printing apparatus comprising:
a printing head configured to apply the inks including at least a light-blocking ink, a specialty gloss ink, and a color ink as the inks; and
a control unit configured to control the printing head in at least one of a first mode and a second mode,
the first mode being for applying the inks onto a printing medium having light-diffusing properties in the order of the light-blocking ink, the specialty gloss ink over the light-blocking ink, and the color ink over the specialty gloss ink,
the second mode being for applying the inks onto a printing medium having light-transmissive properties in the order of the color ink, the specialty gloss ink over the color ink, and the light-blocking ink over the specialty gloss ink.

2. The printing apparatus according to claim 1, wherein the control unit is configured to apply the specialty gloss ink onto the printing medium at a predetermined percentage set as an upper limit.

3. The printing apparatus according to claim 1, wherein the specialty gloss ink is a texture-expressing ink including a pigment expressing a predetermined texture.

4. The printing apparatus according to claim 3, wherein optical characteristics of the specialty gloss ink printed on a surface of the printing medium are dependent on an angle of reflection.

5. The printing apparatus according to claim 3, wherein the specialty gloss ink is a metallic ink including a pigment expressing a metallic finish.

6. The printing apparatus according to claim 1, further comprising
a main scanning unit configured to move the printing head in a width direction of the printing medium, wherein
the printing head includes a plurality of nozzles aligned in a direction intersecting a movement direction of the printing head for each of the inks to discharge the inks,
the nozzles is arranged in the order of the nozzles for the light-blocking ink, the nozzles for the specialty gloss ink, and the nozzles for the color ink from an upstream position in the movement direction of the printing head.

7. The printing apparatus according to claim 1, wherein in the second mode, the control unit is configured to apply a fixed amount of at least one of the light-blocking ink and the specialty gloss ink in a predetermined region including a region for applying the color ink regardless of an image to be printed.

8. The printing apparatus according to claim 1, wherein the printing medium having light-diffusing properties for the second mode is of a color whose brightness is lower than a print density realizable by black ink or the color ink, and
in the first mode, the control unit is configured to apply the light-blocking ink onto the printing medium having light-diffusing properties so that a value of a brightness index L* for a region in which the light-blocking ink has been applied is 70 or higher.

9. A printing method using a plurality of inks, the printing method comprising:
selecting a mode from a plurality of modes including a first mode and a second mode;
applying the inks onto a printing medium having light-diffusing properties in the order of color ink, specialty gloss ink over the color ink, and light-blocking ink over the specialty gloss ink in the first mode; and
applying the inks onto the printing medium in the order of light-blocking ink, specialty gloss ink over the light-blocking ink, and color ink over the specialty gloss ink in the second mode.

* * * * *